United States Patent
Meyer et al.

(10) Patent No.: US 10,635,916 B2
(45) Date of Patent: Apr. 28, 2020

(54) DETERMINING VEHICLE CROWDEDNESS USING REAL-TIME LOCATION DATA

(71) Applicant: Google LLC, Mountain View, CA (US)

(72) Inventors: Cayden Meyer, Pyrmont (AU); Reuben Kan, Carlingford (AU)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/380,372

(22) Filed: Apr. 10, 2019

(65) Prior Publication Data

US 2019/0325239 A1    Oct. 24, 2019

(30) Foreign Application Priority Data

Apr. 23, 2018    (WO) .............. PCT/US2018/0028875

(51) Int. Cl.
*G06K 9/00*    (2006.01)
*G08G 1/123*    (2006.01)
*H04W 4/021*    (2018.01)

(52) U.S. Cl.
CPC ......... *G06K 9/00832* (2013.01); *G08G 1/123* (2013.01); *H04W 4/021* (2013.01)

(58) Field of Classification Search
CPC .... G06K 9/00832; G08G 1/123; H04W 4/021
USPC ....................................................... 340/988
See application file for complete search history.

(56) References Cited

U.S. PATENT DOCUMENTS 8,645,050 B2 * 2/2014 Gontmakher .......... G08G 1/127
340/994

9,329,047 B2    5/2016 Jackson et al.
9,420,424 B2 *    8/2016 Ghose .................... H04W 4/023
9,552,729 B2 *    1/2017 Gontmakher .......... G08G 1/127
9,877,162 B2    1/2018 Wyatt et al.
2013/0041941 A1 *    2/2013 Tomasic ................ G08G 1/123
709/203

(Continued)

FOREIGN PATENT DOCUMENTS

WO    WO 2016/188699    12/2016
WO    WO 2018/021958    2/2018

OTHER PUBLICATIONS

Alahi et al., "Social LSTM: Human Trajectory Prediction in Crowded Spaces", CVRP pp. 961-971.

(Continued)

*Primary Examiner* — John A Tweel, Jr.
(74) *Attorney, Agent, or Firm* — Dority & Manning, P.A.

(57) ABSTRACT

Systems and methods for determining vehicle crowdedness are provided. A method can include obtaining, by a computing system, real-time location data including information identifying a real-time location corresponding to a transit station for each of a plurality of user computing devices; determining, by the computing system using a vehicle crowdedness model, a vehicle crowdedness for one or more transit vehicles departing from one or more transit stations based at least in part on the real-time location data; and communicating, by the computing system, data indicative of the vehicle crowdedness for the one or more transit vehicles to a particular user computing device. The data indicative of the vehicle crowdedness can include information for displaying the vehicle crowdedness for the one or more transit vehicles on the particular user computing device.

20 Claims, 4 Drawing Sheets

(56) References Cited

U.S. PATENT DOCUMENTS

2013/0268148 A1   10/2013   Kondo et al.
2015/0304815 A1   10/2015   Ghose et al.
2017/0200082 A1    7/2017   Bohm
2018/0082586 A1    3/2018   Sengupta et al.

OTHER PUBLICATIONS

Farkas et al., "Participatory Sensing Based Real-Time Public Transport Information Service", 2014 Conference on Pervasive Computing and Communications Demonstrations, pp. 141-144.
Jiao et al., "Measuring Crowdedness between Adjacent Stations in an Urban Metro System: a Chinese Case Study", Sustainability 2017, 14 pages.
Liu et al., "Detecting Crowdedness Spot in City Transportation", IEE Transactions on Vehicular Technology, 16 pages.
Motta et al., "Personal Mobility Service System in Urban Areas: the IRMA Project", Conference paper 2015, 10 pages.
Nagareshmi et al., "Analysis of Segmenting Metro Trips Using Smart Card Data", International Journal of Advanced Research in Management, Architecture, Technology and Engineering, vol. 2, Special Issue 6, Mar. 2016, pp. 109-114.
Zhang et al., "Analyzing Passenger Density for Public Bus: Inference of Crowdedness and Evaluation of Scheduling Choices", $17^{th}$ International Conference on Intelligent Transportation Systems, Qingdao, China, Oct. 8-11, 2014, pp. 2015-2022.

* cited by examiner

DETERMINING VEHICLE CROWDEDNESS USING REAL-TIME LOCATION DATA

PRIORITY CLAIM

The present application is based upon and claims the right of priority under 35 U.S.C. § 365 to International Application No. PCT/US18/28875, filed on Apr. 23, 2018, the disclosure of which is hereby incorporated by reference herein in its entirety for all purposes.

FIELD

The present disclosure relates generally to determining vehicle crowdedness using real-time location data from a plurality of user computing devices. More particularly, the present disclosure relates to systems and methods that leverage one or more vehicle crowdedness models to determine real-time and future vehicle crowdedness for mass transit system vehicles using real-time location data from a plurality of user computing devices.

BACKGROUND

Mass transit systems, such as subways and busses, often have varying ridership patterns, such as on different days of the week, different months of the year, and during different seasons. However, individual events, such as weather events, holidays, concerts, sporting events, etc. can cause the ridership of a transit system on a particular day, time, and/or route to vary significantly. Thus, a particular transit vehicle, such as a subway train departing a particular subway station at a particular time, may itself have varying numbers of passengers, and therefore, varying crowdedness levels. For example, a particular subway train may experience reduced or increased crowdedness due to a confluence of events, thereby making it difficult for an individual passenger to know whether or not a particular transit vehicle is likely to be crowded or not.

In order to get a better understanding of general ridership patterns, some transit system operators may choose to determine average transit vehicle crowdedness levels. For example, a subway system operator may choose one week per year to weigh individual transit vehicles to determine relative ridership patterns on various transit routes. However, such ridership patterns tend to reflect rough approximations of vehicle crowdedness, and do not take into account individual anomalies which can cause fluctuations in the crowdedness of any given transit vehicle at any given time.

Further, the equipment used to obtain such general ridership patterns can be expensive and difficult to retrofit into an existing transit station. Moreover, while some transit system operators may count the number of passengers entering or exiting various transit stations, such gate data does not indicate which specific transit vehicles the passengers choose to ride, and by extension, the real-time crowdedness of the specific transit vehicles.

SUMMARY

Aspects and advantages of the present disclosure will be set forth in part in the following description, or may be obvious from the description, or may be learned through practice of embodiments of the present disclosure.

One example aspect of the present disclosure is directed to a computer-implemented method for determining transit system vehicle crowdedness. The method can include obtaining, by a computing system comprising one or more computing devices, real-time location data for a plurality of user computing devices. The real-time location data can include information identifying a real-time location corresponding to a transit station for each of the plurality of user computing devices. The method can further include determining, by the computing system using a vehicle crowdedness model, a vehicle crowdedness for one or more transit vehicles departing from one or more transit stations based at least in part on the real-time location data for the plurality of user computing devices. The method can further include communicating, by the computing system, data indicative of the vehicle crowdedness for the one or more transit vehicles to a particular user computing device. The data indicative of the vehicle crowdedness can include information for displaying the vehicle crowdedness for the one or more transit vehicles on the particular user computing device.

Another example aspect of the present disclosure is directed to a computing system for determining vehicle crowdedness. The computing system can include one or more processors, and one or more tangible, non-transitory, computer readable media that store instructions that when executed by the one or more processors cause the computing system to perform operations. The operations can include obtaining real-time location data for a plurality of user computing devices. The real-time location data can include information identifying a real-time location corresponding to a transit station for each of the plurality of user computing devices. The operations can further include receiving a request from a particular user computing device for a vehicle crowdedness for a first transit vehicle departing from a first transit station. The operations can further include determining a first subset of user computing devices departing from the first transit station based at least in part on the real-time location data for the plurality of user computing devices. The operations can further include determining a first portion of the first subset of user computing devices departing from the first transit station associated with the first transit vehicle using a vehicle crowdedness model. The operations can further include determining the vehicle crowdedness for the first transit vehicle based at least in part on the first portion. The operations can further include providing the vehicle crowdedness for the first transit vehicle for display on the particular user computing device.

Another example aspect of the present disclosure is directed to at least one non-transitory computer-readable medium that stores instructions that, when executed by a computing device, cause the computing device to perform operations. The operations can include obtaining real-time location data for a plurality of user computing devices. The real-time location data can include information identifying a real-time location corresponding to a transit station for each of the plurality of user computing devices. The operations can further include determining a vehicle crowdedness using a vehicle crowdedness model for one or more transit vehicles departing from one or more transit stations based at least in part on the real-time location data for the plurality of user computing devices. The operations can further include receiving a request from a particular user computing device for a vehicle crowdedness for one or more particular transit vehicles. The operations can further include communicating a response to the particular user computing device. The response can include displaying the vehicle crowdedness for the one or more particular transit vehicles on the particular user computing device.

Other aspects of the present disclosure are directed to various systems, apparatuses, non-transitory computer-readable media, user interfaces, and electronic devices.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
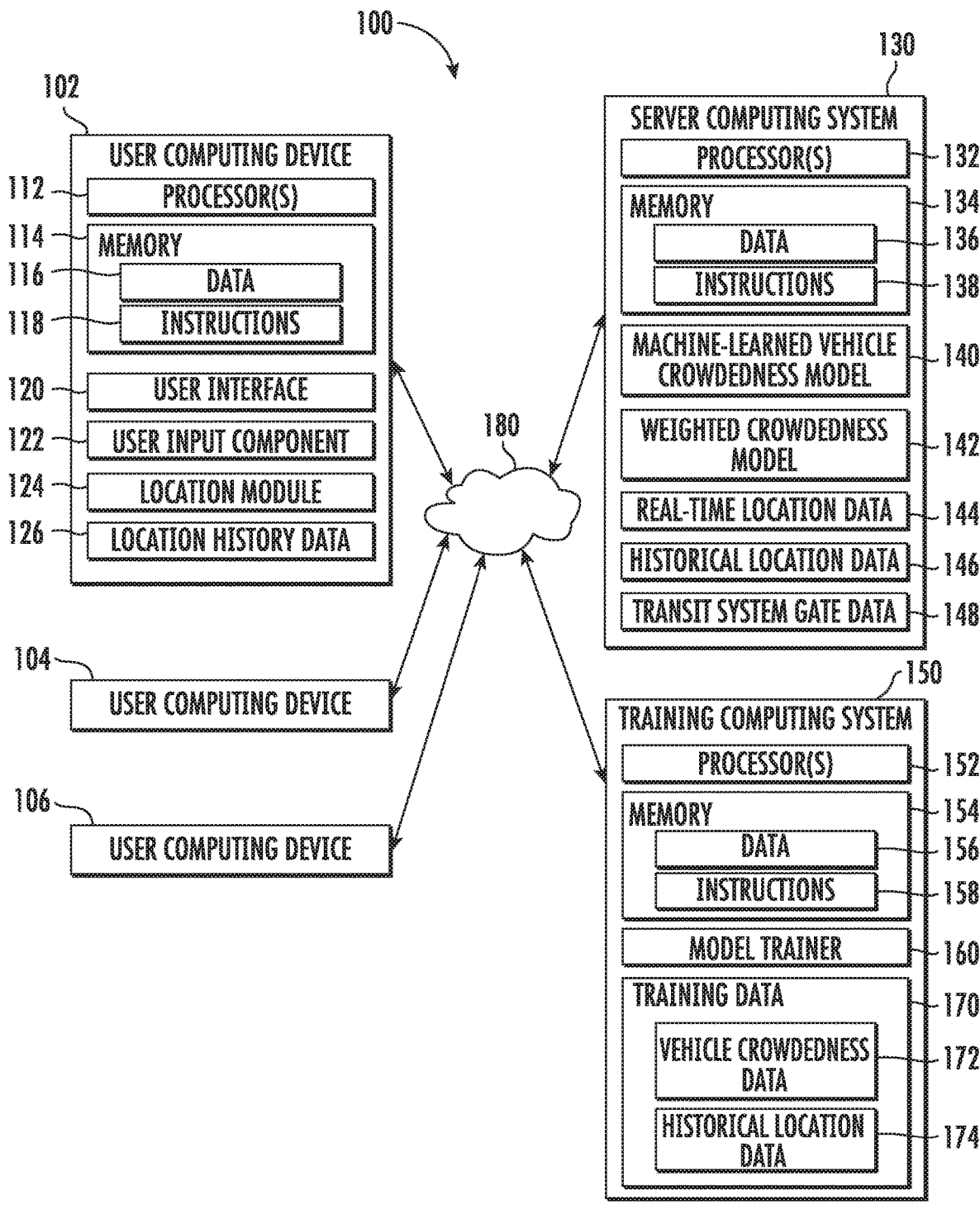
FIG. 1 depicts a block diagram of an example system for determining transit system vehicle crowdedness according to example aspects of the present disclosure.

Generally, the present disclosure is directed to systems and methods for determining transit system vehicle crowdedness using real-time location data obtained from a plurality of user computing devices. For example, different transit system vehicles (e.g., busses, subway cars) may have varying passenger levels over the course of a normal operating period. A vehicle crowdedness can be indicative of the number of passengers riding on a particular transit vehicle, such as a total number of passengers or a percentage of passenger capacity. In particular, the systems and methods of the present disclosure can obtain real-time location data for a plurality of computing devices, such as smartphones, located at one or more transit system stations. A vehicle crowdedness model can then be used to determine a vehicle crowdedness for one or more transit vehicles departing from one or more transit stations based at least in part on the real-time location data. For example, in some implementations, a machine-learned vehicle crowdedness model can be used to determine a crowdedness for transit vehicles departing from a particular station based at least in part on the number of user computing devices located at the transit station. The vehicle crowdedness information can then be communicated to a user computing device, where it can be displayed. In some implementations, an individual user can request crowdedness information for one or more particular transit vehicles, such as by submitting a request on the user's smartphone. In some implementations, the individual user can request an expected crowdedness for a future transit vehicle and/or a transit vehicle departing from a current location of the user. More particularly, computing devices associated with a plurality of users can periodically provide a real-time location report to a computing system implementing the present disclosure. In particular, each location report can provide a real-time location of a user computing device, such as a smartphone. In some examples, the real-time location of a user computing device corresponds to a transit station (e.g., subway, bus, light-rail, train, and/or metro station). For example, the location data included in each location report can be a geocode (e.g. latitude and longitude, etc.), IP address information, WiFi location information, beacon access information, cell tower data, or other information identifying or associated with a particular transit station. The location data may identify a particular transit station or may be used to determine an identity of a particular transit station.

For example, in some implementations, various user computing devices can provide a real-time location report using GPS or GIS systems. In some implementations, the location of an individual user computing device can be determined (e.g., by a remote computing system or the particular computing device) using cell phone tower data, such as by triangulating the location of the device. In some implementations, individual user computing devices can connect to WiFi networks associated with particular transit stations. For example, a particular transit station can be equipped with one or more wireless access points to which individual user computing devices can connect when they are in sufficiently close proximity to the transit station. Similarly, individual transit stations can be equipped with one or more beacons (e.g., Bluetooth low energy beacons), to which user computing devices can connect when proximate to the beacons. In some implementations, the location data for one or more user computing devices can be obtained by a computing system by querying the user computing devices located at a particular transit station, such as computing devices connected to a WiFi or beacon associated with a transit station. In some implementations, individual user computing devices can provide a location report when they are located at a particular transit station. For example, individual user computing devices can be configured to provide a location report when the individual user computing device is located at a particular transit station.

Thus, in some implementations, in order to obtain the benefits of the techniques described herein, the user may be required to allow the collection and analysis of location information associated with the user or her device. For example, in some implementations, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed. As an example, a computing system can obtain real-time location data which can indicate a total number of user computing devices located at a particular transit station, without identifying any particular user(s) or particular user computing device(s).

The computing system can determine a vehicle crowdedness for one or more transit vehicles using a vehicle crowdedness model based at least in part on the real-time location data for the plurality of user computing devices.

In some implementations, the computing system can first determine a subset of user computing devices departing from a particular transit station based at least in part on the real-time location data obtained for the plurality of user computing devices. The user computing devices located at a particular transit station can thus indicate an overall crowdedness for the particular transit station. For example, in some implementations, the subset can include all user computing devices located at a particular transit station and/or which have been at the transit station for a time period less than a threshold (e.g., 15 minutes). For example, user computing devices located at a particular transit station longer than the threshold can be disregarded, such as user computing devices which belong to transit system employees who are not departing the station. In some implementations, the computing system can determine a respective subset of user computing devices in the plurality which are departing from each transit station in a transit system.

The computing system can then determine a respective portion of the subset of user computing devices departing from a particular station which are associated with one or more transit vehicles using the vehicle crowdedness model. For example, in some implementations, the vehicle crowdedness model can allocate the user computing devices departing from a particular transit station to one or more particular transit vehicles (e.g., subway trains) departing from the particular transit station. For example, at least a first portion of a first subset of user computing devices can be associated with a first transit vehicle using the vehicle crowdedness model, a second portion of the first subset of user computing devices can be associated with a second transit vehicle, etc. In some implementations, each user computing device in the subset can be allocated to/associated with a respective transit vehicle using the vehicle crowdedness model.

The computing system can then determine a vehicle crowdedness for one or more transit vehicles based at least in part on the respective portion of user computing devices associated with each respective transit vehicle. For example, as described herein, the portion of user computing devices associated with a particular transit vehicle can be compared to historical vehicle crowdedness data, gate data, and/or other data to determine a crowdedness for one or more transit vehicles.

In some implementations, the vehicle crowdedness model can be a machine-learned model. For example, in some implementations, a machine-learned model can be trained using historical vehicle crowdedness data and historical location data previously obtained from a plurality of user computing devices. For example, a transit system operator, such as a subway system operator, may periodically determine vehicle crowdedness. For example, the subway system operator can weigh each subway car departing from a particular station, and combine the respective vehicle weights with gate data (e.g., tap in/tap out data for passengers entering or exiting the station) to allocate passengers to each respective vehicle. In this way, the subway system operator can approximate the number of passengers riding on specific transit vehicles, and, by extension, the crowdedness of the specific transit vehicles. However, due to the expense and difficulty associated with obtaining such historical vehicle crowdedness data, system operators typically only obtain limited crowdedness data, such as one week per calendar year.

According to example aspects the present disclosure, such historical vehicle crowdedness data can be combined with historical location data to train a machine-learned model. The historical location data can be, for example, previously obtained location data from a plurality of user computing devices for the time period in which the historical vehicle crowdedness data was obtained (e.g., the same week). In some implementations, the historical location data can include data indicative of starting and terminating transit stations (e.g., a first station location at a first time corresponding to entering/boarding a transit system and a second station location at a subsequent time corresponding to exiting/alighting the transit system) and/or a plurality of locations between transit stations which correspond to a transit vehicle route. Using various machine-learning techniques (e.g., back propagation of errors) a machine-learned model can be trained to allocate the user computing devices located at and/or departing from a particular transit station as determined by the historical location data to specific transit vehicles. Once the model has been trained to achieve a sufficient level of accuracy, the real-time location data obtained for the plurality of user computing devices can be input into the machine-learned model to determine the vehicle crowdedness for one or more vehicles departing from one or more transit stations. For example, the machine-learned model can learn passenger/ridership patterns and allocate the real-time user computing devices located at and/or departing from a particular transit station to specific transit vehicles according to the learned patterns.

Further, in some implementations, the machine-learned model can be trained using historical vehicle crowdedness data and historical location data for a first transit system (e.g., New South Wales Metro), and upon achieving a sufficient level of accuracy, the machine-learned model can be applied to a second transit system (e.g., Washington D.C. Metro).

In some implementations, the vehicle crowdedness model can be a weighted crowdedness model. For example, the weighted crowdedness model can be determined based at least in part on historical location data previously obtained from a plurality of user computing devices. For example, as described above, the historical location data can include data indicative of a user computing device entering/boarding transit stations, exiting/alighting transit stations, and/or locations along a particular transit route. Further, the historical location data can include timestamp data corresponding to each particular location. In some implementations, the historical location data can be matched to a transit system schedule to determine weightings for individual transit vehicles departing from particular transit stations. For example, a weighting model can indicate that a particular percentage of user computing devices located at a particular transit station at a particular time historically take a particular transit vehicle (e.g., 70% of passengers take the 8:30 AM yellow line downtown whereas 30% take the 8:35 AM blue line towards the airport).

In some implementations, the crowdedness for transit vehicles departing from a particular station can be determined by comparing the number of user computing devices located at the particular station in real-time to historical data (e.g., a mean or median). For example, a particular station may typically have 20 computing devices located at the transit station on a typical Monday morning, which may correspond to a 50% passenger capacity on a particular vehicle departing the transit station. Thus, on a Monday morning in which 40 computing devices are located at the station, a computing system can determine that the particular train is likely to be at 100% passenger capacity.

In some implementations, a vehicle crowdedness can further be determined based at least in part on gate data, such as real-time gate data. For example, some transit system operators may obtain gate data indicative of the number of passengers entering or exiting particular transit stations. For example, a subway system operator may use turnstiles to count the number of passengers entering or exiting particular transit stations. For example, a passenger can insert a subway ticket, access card, coin, or other payment into an automated turnstile, which can then allow the passenger to enter the transit station and choose a particular transit vehicle to ride. Similarly, passengers exiting a transit station can be counted by passing through a turnstile. However, while the gate data can indicate a number of passengers located at a particular transit station, the gate data does not indicate which particular vehicles the passengers will board. Thus, while the gate data is indicative of station crowdedness, it may not be indicative of the crowdedness of a particular vehicle.

According to an example aspect of the present disclosure, in some implementations, a computing system can obtain the gate data from the transit system operator, and allocate passengers to particular vehicles using the vehicle crowdedness model to determine vehicle crowdedness. For example, the gate data can indicate the number of passengers at a particular station, which can then be allocated to one or more particular vehicles using the vehicle crowdedness model (e.g., a machine-learned model or weighted crowdedness model).

In some implementations, the vehicle crowdedness model can be used to determine a real-time vehicle crowdedness. For example, a real-time vehicle crowdedness can be indicative of the number of passengers riding on a particular transit vehicle at a concurrent time. As an example, a real-time vehicle crowdedness can be a crowdedness of a transit vehicle en route from a previous transit station along a travel route or a transit vehicle currently stopped at a particular transit station. The real-time vehicle crowdedness can be determined by, for example, allocating user computing devices currently located at a particular transit station and/or based on the user computing devices allocated to a particular transit vehicle at a previous transit station.

In some implementations, the vehicle crowdedness model can be used to determine an expected vehicle crowdedness. An expected vehicle crowdedness can be a vehicle crowdedness for a future time. As an example, in some implementations, the expected vehicle crowdedness can be determined based at least in part in on allocating user computing devices currently located at a particular transit station to a particular vehicle which will be departing the particular transit station at a future time. For example, a vehicle crowdedness model may determine that a portion of user computing devices located at a particular transit station will board a particular transit vehicle departing from the particular transit station at a future time (e.g., in 15 minutes). In some implementations, the vehicle crowdedness model can be used to determine an expected vehicle crowdedness at a future time based at least in part on various relationships. For example, real-time location data and/or gate data may indicate that a particular transit station is less crowded than usual (such as due to a holiday), and thus transit vehicles departing from the transit station later in the day are likely to be less crowded than usual.

The vehicle crowdedness information can be provided to individual users, such as upon request. For example, in some implementations, a user can access a user interface on the user's computing device in order to request information on one or more transit vehicles. The computing system can then receive the request, such as via one or more networks.

In some implementations, a user can request vehicle crowdedness information based at least in part on the user's real-time location. For example, a user may be located at or proximate to one or more particular transit stations, and the user's real-time location data can be included in the user's request. For example, the user's real-time location can used to determine the nearest transit station. The computing system can then receive the user's real-time location data, and then provide the vehicle crowdedness for one or more transit vehicles departing from the nearest transit station.

In some implementations, the user can request vehicle crowdedness information by, for example, inputting a particular transit vehicle and/or transit station into a user interface on the user's computing device. For example, in various implementations, a user can access a favorites list of transit vehicles and/or transit stations, access a list of transit vehicles and/or transit stations the user has previously used, search for particular transit vehicles and/or transit stations, etc. In some implementations, the user can request real-time vehicle crowdedness information and/or an expected vehicle crowdedness for one or more transit vehicles departing from a particular transit station at a future time period.

The computing system can communicate vehicle crowdedness information to the user's computing device. In some implementations, the vehicle crowdedness information can be for one or more particular vehicles, such as in response to a user's request. In some implementations, the vehicle crowdedness information can be displayed in a user interface on the user's computing device. In some implementations, the vehicle crowdedness information can be, for example, a graphical representation of the vehicle's crowdedness (such as on a scale of 1-4 person icons). In other implementations, a vehicle crowdedness can be provided/displayed in any suitable manner, such as a percentage of passenger capacity, etc.

The systems and methods of the present disclosure can provide a number of technical effects and benefits. For example, the systems and methods provided herein allow for real-time location data for a plurality of user computing devices to be used to determine vehicle crowdedness for transit vehicles in real time as well as transit vehicles departing at a future time. Moreover, the systems and methods of the present disclosure can allow for vehicle crowdedness information to be determined in an efficient and cost-effective manner. For example, the systems and methods of the present disclosure can leverage existing infrastructure (e.g., passengers' user computing devices) to determine transit system vehicle crowdedness, without requiring any expensive equipment to be installed by a transit system operator. Further, existing transit system infrastructure, such as gate data, can be incorporated into the systems and methods of the present disclosure, which can further increase the accuracy of the vehicle crowdedness information determined in real-time.

Further, in implementations which leverage one or more machine-learned models (e.g., neural networks), the systems and methods of the present disclosure can increase the computational efficiency and accuracy of vehicle crowdedness information. For example, a machine-learned vehicle crowdedness model can be implemented on a computing system, which can learn various ridership patterns for a transit system using historical vehicle crowdedness data and historical location data. Further, once a machine-learned vehicle crowdedness model has been trained to achieve sufficient accuracy on a first transit system, the machine-learned vehicle crowdedness model can be applied to any number of transit systems. In this way, transit system vehicle crowdedness information can be determined in an efficient manner.

The systems and methods of the present disclosure can further provide for an increased user experience for patrons of a transit system. For example, passengers can request vehicle crowdedness information for particular transit vehicles, and can make informed decisions regarding which particular vehicles to ride, such as by selecting particular transit vehicles which are less crowded, and therefore more comfortable. Moreover, over time, the overall efficiency of a transit system may be increased as riders may choose to distribute themselves more evenly by selecting less crowded transit vehicles to ride.

The systems and methods of the present disclosure also provide improvements to computing technology. For example, by leveraging user computing devices and a vehicle crowdedness model, computing efficiency and accuracy can be approved over traditional approaches for measuring vehicle crowdedness, such as using dedicated equipment. In particular, a computing system can obtain real-time location data for a plurality of user computing devices. The real-time location data can be information identifying a real-time location corresponding to a transit station for each of the plurality of user computing devices. The computing system can determine a vehicle crowdedness for one or more transit vehicles departing from one or more transit stations using a vehicle crowdedness model based at least in part on the real-time location data for the plurality of user computing devices. For example, a machine-learned vehicle crowdedness model or a weighted crowdedness model can be used to allocate/associate user computing devices departing from a particular transit station to one or more particular transit vehicles. The vehicle crowdedness for particular transit vehicles can be determined based on the number of user computing devices allocated to/associated with the particular transit vehicle. A user can request vehicle crowdedness information for one or more particular transit vehicles, such as via the user's computing device. The computing system can communicate a response to the particular user computing device, which can include displaying the vehicle crowdedness information for the one or more particular transit vehicles on the particular user computing device.

With reference now to the FIGS., example aspects of the present disclosure will be discussed in further detail. FIG. 1 depicts a block diagram of an example computing system 100 that can determine vehicle crowdedness according to example aspects of the present disclosure. The system 100 includes one or more user computing devices 102/104/106, a server computing system 130, and a training computing system 150 that are communicatively coupled over a network 180.

The user computing devices 102/104/106 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102/104/106 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which can be executed by the processor 112 to cause the user computing device 102/104/106 to perform operations.

In some implementations, the user computing device 102/104/106 can include a user interface 120. The user interface 120 can be used by a user to interact with the user computing device 102/104/106, such as to request vehicle crowdedness information for one or more specific transit vehicles. An example user interface 120 according to example aspects of the present disclosure will be discussed in greater detail with respect to FIG. 4.

The user computing device 102/104/106 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. The user input component 122 can allow for a user to provide user input, such as via a user interface 120.

A user computing device 102/104/106 can further include a location module 124. The location module 124 can be configured to determine, obtain, and/or provide data indicative of a location of a user computing device 102/104/106. In some implementations, the data indicative of a location can correspond to a transit station of a mass transit system. For example, the data indicative of a location can be mapped to a particular transit station of a mass transit system.

As such, in some embodiments, in order to obtain the benefits of the techniques described herein, the user may be required to allow the collection and analysis of location data associated with the user or her device(s). For example, in some embodiments, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed.

In some implementations, a location module 124 can include a GPS and/or GIS module that receives a GPS/GIS signal and calculates coordinates of the user computing device 102/104/106. Additionally, in some implementations, the location module can include a GSM/GPRS modem configured to transmit data indicative of the location of the user computing device 102/104/106. In some implementations, the location module 124 can be configured to provide geocode data associated with the location of a user computing device 102/104/106.

In some implementations, the location module 124 can include one or more cellular communication components. For example, a location module 124 can include antennas, receivers, chips, or other equipment configured to communicate over GSM, CDMA, AMPS, 1G, 2G, 3G, 4G, 5G, LTE, GPRS, and/or other wireless cellular networks. In some implementations, the location module 124 can be configured to determine a location of a user computing device 102/104/106 by triangulating a position of the user computing device 102/104/106 using the one or more wireless cellular networks. In some implementations, data indicative of the location of a user computing device 102/104/106 can include cell tower data, such as cell tower data used to triangulate the position of the user computing device 102/104/106, such as by a server computing device 130.

In some implementations, the location module 124 can include one or more WiFi wireless local area network communication components. For example, a location module 124 can include antennas, receivers, chips, or other equipment configured to communicate wirelessly via a local area network. In some implementations, the location module 124 can be configured to connect to specific wireless access points associated with specific transit stations. For example, individual transit stations in a mass transit system can be equipped with wireless access points, and individual user computing devices 102/104/106 can connect to the wireless access points when they are in sufficiently close proximity. In some implementations, data indicative of the location of an individual user computing device 102/104/106 can include an IP address of the user computing device 102/104/106.

In some implementations, the location module 124 can include one or more beacon communication components, such as Bluetooth low energy beacon communication components. For example, a location module 124 can include components configured to transmit a universally unique identifier using Bluetooth low energy proximity sensing, which can be used to determine the location of an individual user computing device 102/104/106. In some implementations, individual mass transit stations can include one or more Bluetooth low energy beacons configured to communicate with a user computing device 102/104/106. In some implementations, data indicative of the location of an individual user computing device 102/104/106 can include beacon access data.

The location module 124 and its associated functionality can be implemented in hardware, firmware, and/or software controlling a general purpose processor. In this way, the location of an individual user computing device 102/104/106 can be determined using a variety of location techniques, and can be performed to determine a real-time location of the user computing device 102/104/106. Further, the user computing devices 102/104/106 can provide data indicative of a real-time location of the devices 102/104/106, such as via a network 180.

A user computing device 102/104/106 can further include location history data 126. For example, the location history data 126 can include data indicative of a previous location of a user computing device 102/104/106 obtained at a previous time. For example, in some implementations, a location module 124 can be configured to determine a real-time location of a user computing device 102/104/106, and store the location along with a time-stamp reflecting the time the location was determined. In some implementations, the location history data 126 can be stored in a memory 114.

The system 100 can further include a server computing system 130 and/or a training computing system 150. The user computing devices 102/104/106 can be configured to provide real-time location data and/or location history data 126 to a server computing system 130 and/or a training computing system 150, such as via one or more networks 180.

The server computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof In some implementations, the server computing system 130 can store or include one or more vehicle crowdedness models. For example, the server computing system 130 can include one or more machine-learned vehicle crowdedness models 140 and/or one or more weighted crowdedness models 142. The server computing system 130 can be configured to obtain real-time location data for a plurality of user computing devices 102/104/106, wherein the real-time location data comprises information identifying a real-time location corresponding to a transit station for each of the plurality of user computing devices 102/104/106. For example, the user computing devices 102/104/106 can provide their real-time location to the server computing system 130 via one or more networks 180, where it can be stored as real-time location data 144. The server computing system 130 can then use the vehicle crowdedness models 140/142 to determine a vehicle crowdedness for one or more transit vehicles departing from one or more transit stations based at least in part on the real-time location data 144 for the plurality of user computing devices 102/104/106.

In some implementations, the server computing system 130 can determine a vehicle crowdedness by first determining a first subset of user computing devices 102/104/106 departing from a first transit station based at least in part on the real-time location data 144 for the plurality of user computing devices 102/104/106. For example, in some implementations, the first subset of user computing devices 102/104/106 departing from the first transit station can be determined by determining which user computing devices 102/104/106 have been at the first transit station for a time period less than a threshold. Thus, user computing devices 102/104/106 which have been at the first transit station for longer than the threshold, such as transit system employee's user computing devices 102/104/106, can be assumed to not be departing the first transit station.

In some implementations, the server computing system 130 can then determine a first portion of the first subset of user computing devices 102/104/106 departing from the first transit station associated with a first transit vehicle using the vehicle crowdedness model (e.g., machine-learned vehicle crowdedness model 140 or weighted crowdedness model 142). For example, the server computing system 130 can allocate one or more of the user computing devices 102/104/106 departing from the first transit station to one or more particular transit vehicles using the vehicle crowdedness model. In some implementations, each user computing device 102/104/106 in the first subset can be allocated to and/or associated with a particular transit vehicle.

The server computing system 130 can then determine the vehicle crowdedness for the first transit vehicle based at least in part on the portion of user computing devices allocated to the first transit vehicle. For example, the computing system 130 can compare the number of computing devices 102/104/106 in the first portion to one or more thresholds in order to determine the crowdedness of the first transit vehicle.

In some implementations, the vehicle crowdedness model can be used to determine a real-time vehicle crowdedness. For example, the computing system 130 can use the vehicle crowdedness model to determine a real-time vehicle crowdedness for a particular transit vehicle based at least in part on the real-time location data for the plurality of user computing devices 102/104/106. For example, in some implementations, the real-time vehicle crowdedness can be determined based at least in part on allocating user computing devices 102/104/106 currently located at a particular transit station to a particular vehicle which is located at the particular transit station.

In some implementations, the vehicle crowdedness model can be used to determine an expected vehicle crowdedness. For example, in some implementations, the expected vehicle crowdedness can be determined based at least in part in on allocating user computing devices currently located at a particular transit station to a particular vehicle which will be departing the particular transit station at a future time. For example, a vehicle crowdedness model may determine that a portion of user computing devices 102/104/106 located at a particular transit station will board a particular transit vehicle departing from the particular transit station at a future time (e.g., in 15 minutes).

In some implementations, the vehicle crowdedness model can be used to determine an expected vehicle crowdedness at a future time based at least in part on various relationships. For example, real-time location data and/or gate data may indicate that a particular transit station is less crowded than usual (such as due to a holiday), and thus transit vehicles departing from the transit station later in the day are likely to be less crowded than usual.

In some implementations, one or more machine-learned vehicle crowdedness models 140 can be used to determine the vehicle crowdedness. The machine-learned vehicle crowdedness models 140 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned vehicle crowdedness models 140 are discussed with reference to FIG. 2.

The one or more machine-learned vehicle crowdedness models 140 can be used to determine a vehicle crowdedness for one or more transit vehicles departing from one or more transit stations. For example, according to example aspects of the present disclosure, one or more machine-learned vehicle crowdedness models 140 can be trained by a training computing system 150 to determine the vehicle crowdedness for the one or more transit vehicles departing from the one or more transit stations based at least in part on real-time location data for a plurality of user computing devices 102/104/106. In some implementations, a real-time location for a plurality of user computing devices 102/104/106 can be obtained by the server computing system 130, and a vehicle crowdedness for one or more transit vehicles can be determined using the machine-learned vehicle crowdedness model 140. For example, the server computing system 130 can obtain real-time location data 144 from a plurality of user computing devices 102/10204/106 which have opted to use the crowdedness service, and can input the real-time location data 144 into the machine-learned vehicle crowdedness model 140 to obtain a vehicle crowdedness for one or more particular transit vehicles in a transit system.

In some implementations, the server computing system 130 can store or include one or more weighted crowdedness models 142. For example, in some implementations, a weighted crowdedness model 142 can be used to determine a weighting of user computing devices departing on one or more particular transit vehicles from one or more particular transit stations at one or more particular times based at least in part on historical location data 146 previously obtained from a plurality of user computing devices 102/104/106. For example, in some implementations, a weighted crowdedness model 142 can assign a likelihood, or weighting, of a particular user device 102 located at a particular transit station taking a particular transit vehicle. For example, a particular user computing device 102 located at a particular transit station at a particular time may have a 70% weighting to travel on a first train and a 30% weighting to travel on a second train. In some implementations, the weighted crowdedness model 142 can associate/allocate individual user computing devices 102/104/106 located at particular transit stations to one or more particular transit vehicles. For example, each computing device 102/104/106 departing the transit station can be allocated to a particular transit vehicle, such as individually or in subsets associated with particular transit vehicles. In some implementations, each user computing device 102/104/106 located at a particular transit station can be associated with and/or allocated to a particular transit vehicle using the weighted crowdedness model 142, and the vehicle crowdedness for a particular transit vehicle can be determined based at least in part on the number of user computing devices 102/104/106 associated with/allocated to the particular transit vehicle. For example, the total number of user computing devices 102/104/106 allocated to the particular vehicle can be compared to historical trends and/or various thresholds in order to determine whether the ridership of the particular transit vehicle is more or less crowded than normal.

In some implementations, the one or more weighted crowdedness models 142 can be determined based at least in part on the historical location data 146 previously obtained from a plurality of user computing devices. For example, a plurality of user computing devices 102/104/106 can provide individual location history data 126 to the server computing device 130, where it can be stored as historical location data 146. The historical location data 146 can include data indicative of a user computing device 102/104/106 entering/boarding transit stations, exiting/alighting transit stations, and/or locations along a particular transit route. Further, the historical location data 146 can include timestamp data corresponding to each particular location. In some implementations, the historical location data 146 can be matched to a transit system schedule to determine weightings for individual transit vehicles departing from particular transit stations. For example, a weighting model can indicate that a particular percentage of user computing devices 102/104/106 located at a particular transit station at a particular time historically take a particular transit vehicle. The weighted crowdedness model 142 can provide a weighting or likelihood of a particular user computing device 102/104/106 taking the particular transit vehicle, as determined based on the historical location data 146.

In some implementations, the server computing system 130 can include or otherwise obtain transit system gate data 148. For example, a transit system operator may use infrastructure to determine the number of passengers entering and/or exiting a particular transit station, such as via turnstiles. In some implementations, the transit system operator can provide the transit system gate data 148 to the server computing system 130. In some implementations, the transit system gate data 148 can be input into the machine-learned vehicle crowdedness model 140 and/or the weighted crowdedness model 142 in order to determine the vehicle crowdedness of one or more particular transit vehicles. For example, the gate data 148 may indicate that a particular transit station is more or less busy than normal, and further, that particular transit vehicles are likely to be more or less crowded than normal.

In some implementations, the server computing system 130 can receive a request from a particular user computing device 102/104/106 for a vehicle crowdedness for one or more particular transit vehicles. For example, a user can request vehicle crowdedness information, such as through a user interface 120. In some implementations, the user can request vehicle crowdedness information on particular transit vehicles, such as through a search function, a list of previously ridden transit vehicles, and/or a favorites list. In some implementations, a user can request vehicle crowdedness information based on a real-time location of the user. For example, a request from a particular user computing device 102/104/106 can include real-time location data for the particular user computing device 102/104/106. The server computing device 130 can use the real-time location data for the particular user computing device 102/104/106 to determine a current transit station and/or nearest transit station, and provide vehicle crowdedness information for transit vehicles currently located at and/or departing from the transit station at a future time. The server computing device 130 can communicate a response to the particular user computing device 102/104/106, which can include displaying the vehicle crowdedness information on the particular user computing device 102/104/106. For example, in some implementations, the requested vehicle crowdedness information can be displayed via a user interface 120 of the user computing device 102/104/106.

In some implementations, the computing system 130 can communicate data indicative of the vehicle crowdedness for one or more transit vehicles to one or more user computing devices, such as via a network 180. For example, the computing system 130 can communicate data indicative of the vehicle crowdedness for one or more transit vehicles via a network 180 upon determining the vehicle crowdedness for the one or more vehicles using the vehicle crowdedness model.

The system 100 can further include a training computing system 150. The user computing devices 102/104/106 and/or the server computing system 130 can train the machine-learned model 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the one or more machine-learned vehicle crowdedness models 140 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the one or more machine-learned vehicle crowdedness models 140 based on a set of training data 170. The training data 170 can include, for example, historical vehicle crowdedness data 172 and historical location data 174 (e.g., the same/similar data as historical location data 146). For example, a transit system operator, such as a subway system operator, may periodically determine vehicle crowdedness data 172 for specific transit vehicles. For example, the subway system operator can weigh each subway car departing from a particular transit station, and combine the respective vehicle weights with gate data (e.g., tap in/tap out data for passengers entering or exiting the transit station) to allocate passengers to each respective transit vehicle departing the transit station. In this way, the subway system operator can approximate the number of passengers riding on specific transit vehicles, and, by extension, the crowdedness of the specific transit vehicles. For example, the vehicle crowdedness can be determined by comparing the number of passengers riding on a specific transit vehicle to the capacity of the particular transit vehicle. In some implementations, the historical vehicle crowdedness data 172 can be represented, for example, as a histogram depicting the percent capacity for each transit vehicle departing a transit station according to a transit schedule. In a typical application, a transit system operator may obtain historical vehicle crowdedness data 172 for a limited time period, however, such as one week per year.

The one or more machine-learned vehicle crowdedness models 140 can further be trained based on historical location data 174 obtained from a plurality of user computing devices 102/104/106. For example, if the user has provided consent, a user's location history data 126 can be provided by the user computing device 102 to the server computing system 130 and/or the training computing system 150. For example, as described herein, the one or more user computing devices 102/104/106 can be configured to store location history data 126, which can include data indicative of a particular location at a particular time. The historical location data 174 can include location history data 126 for the user computing devices 102/104/106 corresponding to the vehicle crowdedness data 172. For example, the historical location data 174 can include the user computing devices 102/104/106 which have provided consent and which were located at/travelled through a particular transit station during the time period the historical vehicle crowdedness data 172 was obtained. The model trainer 160 can use the training data 170 in order to train the one or more machine-learned vehicle crowdedness models 140 by, for example, mapping/assigning/allocating user computing devices 102/104/106 as represented by the historical location data 174 to the historical vehicle crowdedness data 172.

In some implementations, once the one or more machine-learned vehicle crowdedness models 140 have been trained to achieve a sufficient level of accuracy, the real-time location data for a plurality of user computing devices 102/104/106 can be input into one or more machine-learned vehicle crowdedness models 140 to determine a vehicle crowdedness for particular transit vehicles in a transit system. Further, once the one or more machine-learned vehicle crowdedness models 140 have been trained using historical vehicle crowdedness data 172 and historical location data 174 for a first transit system, the one or more machine-learned vehicle crowdedness models 140 can be applied to a second transit system.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 2:
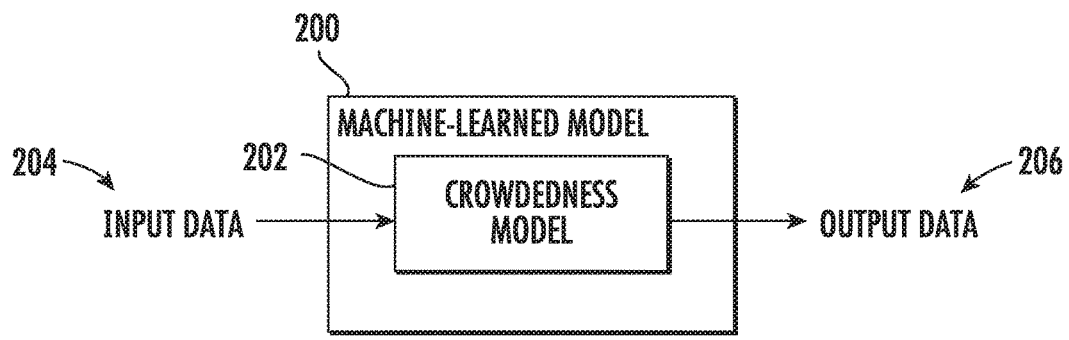
FIG. 2 depicts a block diagram of an example machine-learned crowdedness model according to example aspects of the present disclosure.

Referring now to FIG. 2, a block diagram of an example machine-learned model 200 according to example embodiments of the present disclosure is depicted. In some implementations, the machine-learned model 200 is trained to receive a set of input data 204 descriptive of real-time location for a plurality of user computing devices, and, as a result of receipt of the input data 204, provide output data 206 that is descriptive of a vehicle crowdedness. Thus, in some implementations, the machine-learned model 200 can include a crowdedness model 202 that is operable to determine a crowdedness of particular transit vehicles in a transit system.

For example, the crowdedness model 202 can be trained based at least in part on historical vehicle crowdedness data and historical location data previously obtained from a plurality of user computing devices 102/104/106, as described herein. The crowdedness model 202 can be trained to associate the historical location data to the historical vehicle crowdedness data such that the crowdedness model 202 can then determine specific vehicle crowdedness information using real-time location data for a plurality of user computing devices 102/104/106 as an input.

In some implementations, the crowdedness model 202 can further be trained based at least in part on gate data. For example, the gate data can include data indicative of the number of passengers entering or exiting one or more particular transit stations. In some implementations, the crowdedness model 202 can further be trained to receive input data 204 which includes gate data (e.g., real-time gate data) for one or more transit stations, and determine a vehicle crowdedness for one or more transit vehicles based at least in part on the gate data.

In some implementations, the crowdedness model 202 can be trained to determine both real-time and future vehicle crowdedness. For example, the crowdedness model 202 can determine a real-time vehicle crowdedness by, for example, associating/allocating individual user computing devices 102/104/106 located at a particular transit station to particular transit vehicles in real-time. Similarly, the crowdedness model 202 can determine a future vehicle crowdedness by, for example, learning relationships between current station crowdedness as determined by the number of user computing devices 102/104/106 located at a particular station in real-time and vehicle crowdedness for transit vehicles at a future time.

Figure 3:
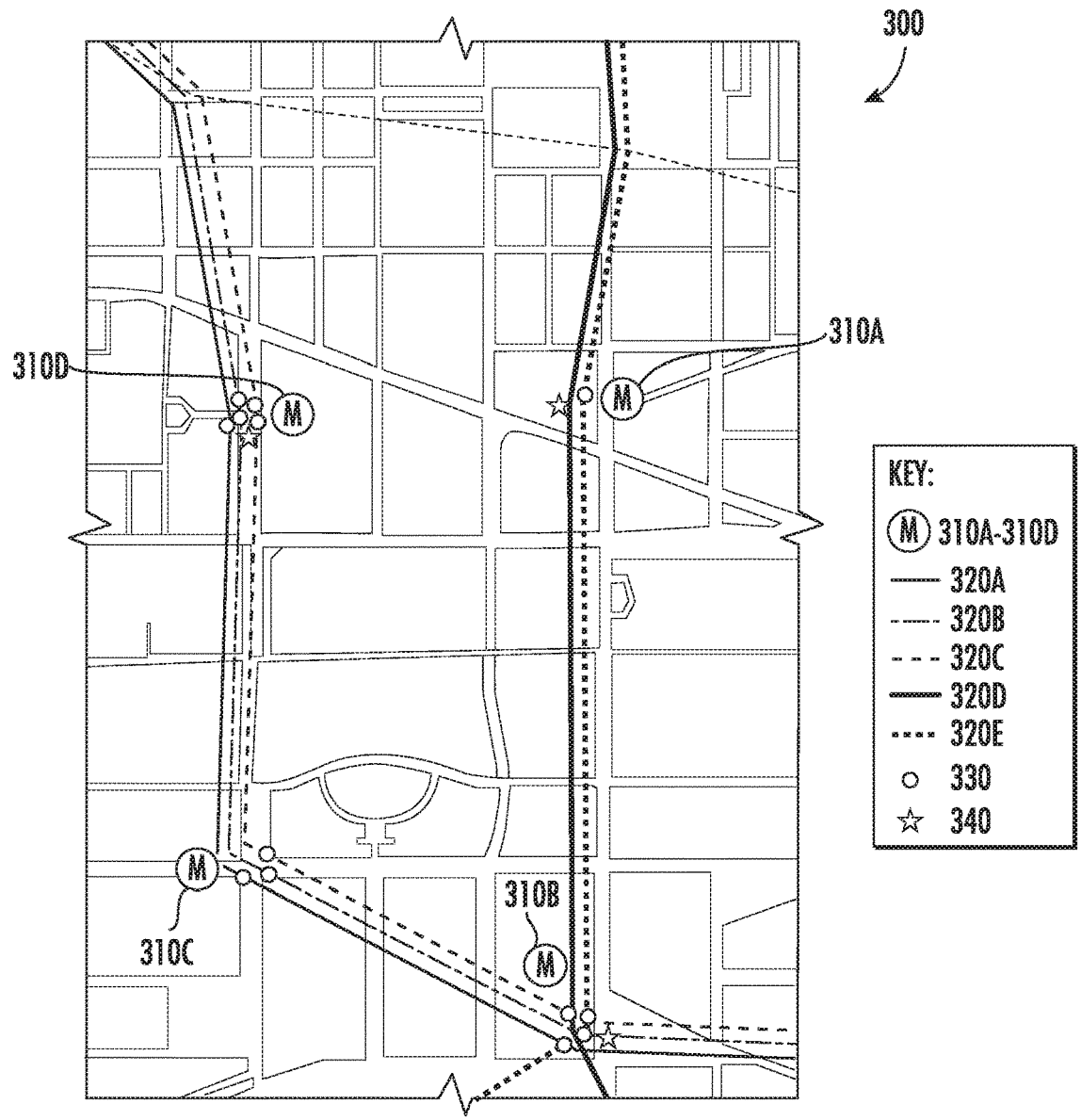
FIG. 3 depicts a graphical representation of an example transit system with a real-time location overlay for a plurality of computing devices according to example aspects of the present disclosure.

Referring now to FIG. 3, an example graphical representation of an example transit system 300 with a real-time location overlay for a plurality of user computing devices is depicted. As shown in FIG. 3, the portion of the transit system 300 depicted includes four transit stations 310A-D. Each transit station 310A-D is served by a plurality of transit routes, as represented by solid and dashed lines 320A-E connecting the stations 310A-D. Each transit route can correspond to, for example, a different line for a mass transit system. For example, transit route 320A can correspond to a "blue line" and transit route 320B can correspond to a "yellow line," etc. of a subway system.

According to example aspects of the present disclosure, real-time location data for a plurality of user computing devices 330/340 can be obtained by a computing system, such as by a server computing system 130. The real-time location data for each user computing device 330/340 can correspond to a particular transit station 310A-D. For example, user computing devices located at a transit station 310 for less than a threshold time period are represented by dots 330, whereas user computing devices located at a transit station 310 and for more than the threshold time period are represented by stars 340. For example, transit station 310B has four user computing devices 330 which have been at the transit station 310B for less than a threshold time period, and one user computing device 340 which has been at the transit station 310B for more than the threshold time period. The user computing devices 330/340 can be, for example, the user computing devices 102/104/106 as depicted in FIG. 1.

The real-time location data for each of the user computing devices 330/340 can be used by the computing system, such as a server computing system 130, to determine a vehicle crowdedness using the vehicle crowdedness models, as described herein. For example, in some implementations, the computing system can first determine a subset of user computing devices departing from a particular transit station 310 based at least in part on the real-time location data for the plurality of user computing devices. For example, the location data for each user computing devices 330/340 can correspond to a particular transit station 310A-D. In some implementations, the computing system can determine the user computing devices departing from a particular transit station 310A-D by determining the user computing devices 330 which have been at the transit station 310 less than the threshold time period. For example, the threshold time period can be a time period based on the time between transit vehicles on a particular transit route (e.g., twice as long as the time period between transit vehicles).

The computing system can then use one or more vehicle crowdedness models, such as weighted crowdedness models or machine-learned vehicle crowdedness models, to determine a vehicle crowdedness based on the user computing devices departing from a particular transit station 310A-D. For example, in some implementations, the computing system can use a vehicle crowdedness model to associate a first portion of the user computing devices departing from a particular transit station 310A-D to a first transit vehicle using the vehicle crowdedness model. For example, the five user computing devices 330 which have been at transit station 310B for less than the threshold time period can be determined to be departing the transit station 310B, and can be associated with/allocated to one or more transit vehicles departing the transit station 310B using the vehicle crowdedness model. For example, the vehicle crowdedness model may determine that a first portion (e.g., two user computing devices 330) are associated with a first transit vehicle (e.g. next uptown yellow line transit vehicle), a second portion (e.g. one user computing device 330) is associated with a second transit vehicle (e.g., next downtown yellow line transit vehicle), a third portion (e.g., one user computing device 330) is associated with a third transit vehicle (e.g., next blue line transit vehicle towards the airport), and a fourth portion (e.g., one user computing device 330) is associated with a fourth transit vehicle (e.g., a future green line transit vehicle to a museum district).

In some implementations, the computing system can determine a portion of user computing devices 330 associated with a particular transit vehicle, such as upon request. In some implementations, the computing system can determine a portion of user computing devices 330 associated with a plurality of transit vehicles, such as each transit vehicle currently operating within a transit system or each transit vehicle scheduled to travel through a particular transit station 310 within a particular time period.

In some implementations, the computing system can then determine a vehicle crowdedness for one or more particular transit vehicles based at least in part on the portion of user computing devices 330 associated with the particular transit vehicle. For example, in some implementations, the vehicle crowdedness model can compare the number of user computing devices 330 associated with a particular transit vehicle to one or more thresholds. For example, the one or more thresholds can correspond to different crowdedness ranges, and can be determined based upon historical vehicle crowdedness data. For example, a single user computing device 330 associated with a particular transit vehicle departing from a particular transit station at a particular time may correspond to a relatively low vehicle crowdedness (e.g., <25% passenger capacity), whereas four user computing devices 330 may correspond to a relatively high vehicle crowdedness (e.g., approximately 100% passenger capacity). In this way, a computing system can determine a vehicle crowdedness for one or more particular transit vehicles based at least in part on real-time location data for a plurality of user computing devices 330/340.

Figure 4:
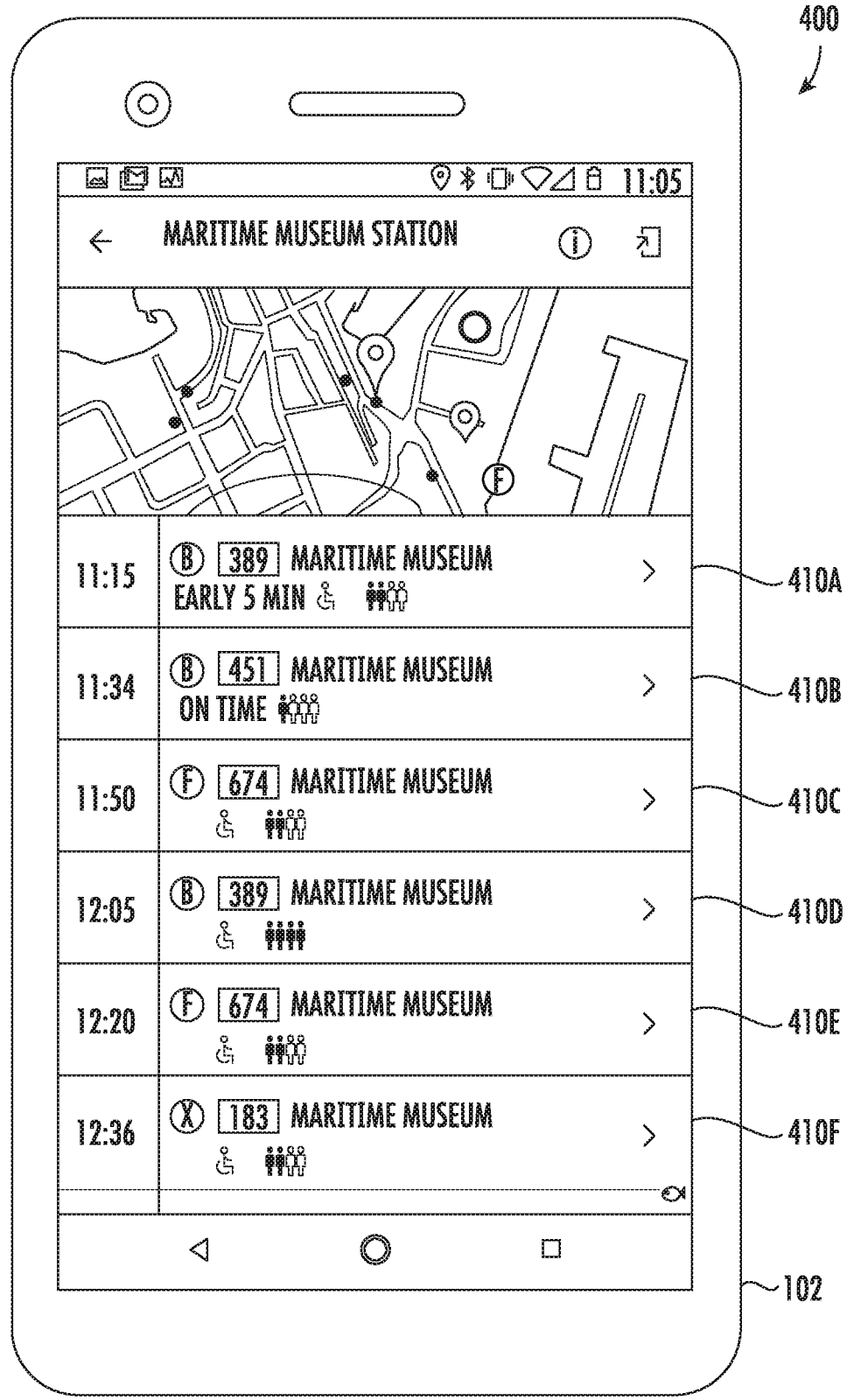
FIG. 4 depicts an example user interface for displaying a vehicle crowdedness on a user computing device.

Referring now to FIG. 4, an example user interface 400 according to example aspects of the present disclosure is depicted. User interface 400 depicts just one example user interface for displaying vehicle crowdedness information. Other suitable user interfaces can similarly be used. In some implementations, user interface 400 can be displayed on a personal computing device, such as a smart phone, laptop, or other user computing device 102. In some implementations, user input requesting vehicle crowdedness information can be received via a user interface 400, which can then be communicated to a computing system, such as a server computing system 130. The computing system can then communicate the requested vehicle crowdedness information to the user computing device 102, where it can be displayed in the user interface 400.

For example, in some implementations, a user can request vehicle crowdedness information for one or more particular transit vehicles departing from a particular transit station. For example, as depicted in FIG. 4, a user can select a particular transit station (e.g., "Maritime Museum Station"). In some implementations, the request from the user can include the real-time location data for the particular user computing device. For example, a user located at the Maritime Museum Station can send a request for transit vehicles departing from the Maritime Museum Station, which can include the real-time location data for the user. In other user interfaces, a user can request vehicle crowdedness information in other ways, such as accessing a list of favorites, searching for specific transit vehicles and/or transit stations, selecting from a list of previously ridden transit vehicles, or other types of requests.

In some implementations, as depicted in FIG. 4, information for a plurality of particular transit vehicles can be displayed in a user interface 400. For example, as depicted, six transit vehicles 410A-F are shown. Particular transit vehicles can be identified by, for example, a transit route (e.g., "B", "F", etc.), a scheduled departure time (e.g., "11:15", etc.), a transit vehicle number (e.g., "389", "451", etc.), a transit station (e.g., "Maritime Museum"), and/or other information. In some implementations, additional information can also be provided via a user interface 400, such as whether the particular transit vehicle is early, on-time, or delayed, whether the transit vehicle is handicapped accessible, or other information.

According to example aspects of the present disclosure, vehicle crowdedness information for the one or more particular transit vehicles can be also displayed in the user interface 400. For example, as depicted, a vehicle crowdedness information for each particular transit vehicle can be displayed graphically, such as using shaded icons on a scale of 1-4. For example, as depicted, the 11:34 B train 451 (410B) is only a 1 out of 4 on a crowdedness scale, whereas the 12:05 B train 389 (410D) is a 4 out of 4 on the crowdedness scale. Each person icon can correspond to a particular range, such as a passenger capacity range (e.g., 0-25% capacity is 1 out of 4, 25-50% capacity is 2 out of 4, etc.). In other implementations, vehicle crowdedness information can be displayed in other suitable formats, such as percentages (e.g., "50% capacity), colors (e.g., red for very crowded, green for sparsely crowded), etc. Thus, according to example aspects of the present disclosure, vehicle crowdedness information requested by a user can be provided for display in a user interface 400 on a user computing device 102. Further, the vehicle crowdedness information can include real-time vehicle crowdedness information, as well as vehicle crowdedness information at a future time.

Figure 5:
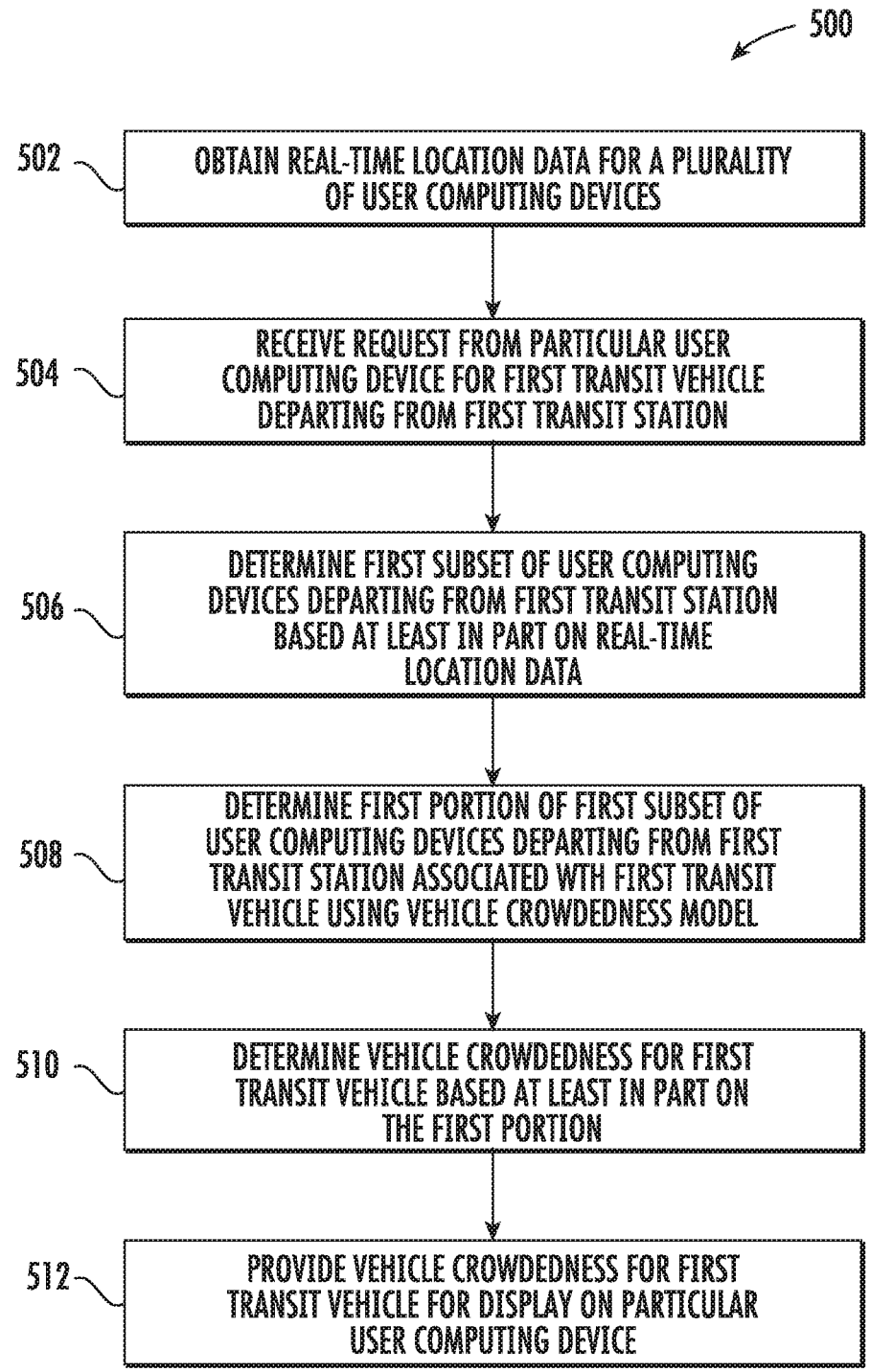
FIG. 5 depicts an example method for determining vehicle crowdedness according to example aspects of the present disclosure.

FIG. 5 depicts a flow diagram of an example method (500) for determining vehicle crowdedness according to example aspects of the present disclosure. Method (500) can be implemented by computing device, such as a server computing device 130 depicted in FIG. 1, or other computing device. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (502), the method (500) can include obtaining real-time location data for a plurality of user computing devices. The real-time location data can include information identifying a real-time location corresponding to a transit station for each of the plurality of user computing devices. In some implementations, the real-time location data can include one or more of geocode data, IP address data, WiFi access data, beacon access data, and/or cell phone tower data.

At (504), the method (500) can optionally include receiving a request from a particular user computing device for a first transit vehicle departing from a first transit station. For example, a user can use user interface displayed on the user's computing device to request information on one or more particular transit vehicles.

In some implementations, the request from the particular user computing device can include real-time location data for the particular user computing device. For example, the user's real-time location can be used to access vehicle crowdedness for one or more particular transit vehicles departing from a particular transit station at which the user is located.

In other implementations, the user can request vehicle crowdedness information on particular transit vehicles and/or particular transit stations, access a list of favorite transit vehicles and/or transit stations, access a list of previously ridden transit vehicles and/or previously visited transit stations, or request vehicle crowdedness information in any other suitable way.

In some implementations, the user can request a real-time vehicle crowdedness for one or more transit vehicles departing from a particular transit station. For example, the real-time vehicle crowdedness can be indicative of the current crowdedness of each respective transit vehicle.

In some implementations, the user can request an expected vehicle crowdedness for one or more particular transit vehicles. For example, the expected vehicle crowdedness can be indicative of an expected crowdedness of each respective transit vehicle at a future time.

The computing system can then determine a vehicle crowdedness for one or more transit vehicles departing from one or more transit stations based at least in part on the real-time location data for the plurality of user computing devices using a vehicle crowdedness model. In some implementations, the computing system can determine a vehicle crowdedness for one or more vehicles in response to a user request. In some implementations, the computing system can determine a vehicle crowdedness for a plurality of transit vehicles, such as each transit vehicle in a transit system For example, in some implementations, at (506), the method (500) can include determining a first subset of user computing devices departing from the first transit station based at least in part on the real-time location data. In some implementations, the first subset of user computing devices departing from the first transit station can be determined by determining the number of user computing devices which have been at the first transit station for a time period less than a threshold. For example, user computing devices associated with transit system employees which have been located at the first transit station for a time period greater than the threshold can be assumed to not be departing from the first transit station. Rather, user computing devices which have been at the first transit station for a time period less than the threshold can be assumed to be departing user computing devices.

At (508), the method (500) can include determining a first portion of the first subset of user computing devices departing from the first transit station associated with the first transit vehicle using the vehicle crowdedness model. For example, the vehicle crowdedness model can be used to associate/allocate the departing user computing devices with one or more particular transit vehicles. In some implementations, each departing user computing device can be associated with a particular transit vehicle. For example, the first subset of user computing devices departing from the first transit station can be split into one or more portions, wherein each portion is associated with a particular transit vehicle.

In some implementations, the vehicle crowdedness model can be a machine-learned model trained based at least in part on historical vehicle crowdedness data and historical location data previously obtained from a plurality of user computing devices.

In some implementations, the vehicle crowdedness model can be a weighted crowdedness model, wherein the weighted crowdedness model comprises a weighting of user computing devices departing on one or more particular transit vehicles from one or more particular transit stations at one or more particular times determined based at least in part on historical location data previously obtained from a plurality of user computing devices.

At (510), the method (500) can include determining a vehicle crowdedness for the first transit vehicle based at least in part on the first portion. For example, the number of user computing devices associated with the first transit vehicle can be compared with one or more thresholds in order to determine the vehicle crowdedness for the first transit vehicle. In some implementations, the one or more thresholds can be determined based on historical vehicle crowdedness data. In some implementations, the one or more thresholds can be determined based on historical location data previously obtained from a plurality of user computing devices. In some implementations, the vehicle crowdedness for the first transit vehicle can be determined by the vehicle crowdedness model.

In some implementations, the method (500) can further include obtaining gate data for one or more transit stations, and the vehicle crowdedness can be further determined based at least in part on the gate data. The gate data can include data indicative of the number of passengers entering or exiting the one or more transit stations.

At (512), the method (500) can include providing the vehicle crowdedness for the first transit vehicle for display on the particular user computing device. For example, the computing system can communicate a response to the particular user computing device, wherein the response includes information for displaying the vehicle crowdedness for the first transit vehicle on the particular user computing device. In some implementations, the computing system can communicate vehicle crowdedness information for one or more transit vehicles (e.g., all vehicles for which a vehicle crowdedness has been determined) to a user computing device, such as when no request for particular vehicle crowdedness information has been received. In some implementations, the vehicle crowdedness for the first transit vehicle can be displayed in a user interface on the particular user computing device.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for determining transit system vehicle crowdedness, comprising:

obtaining, by a computing system comprising one or more computing devices, real-time location data for a plurality of user computing devices, wherein the real-time location data comprises information identifying a real-time location corresponding to a transit station for each of the plurality of user computing devices;

determining, by the computing system using a vehicle crowdedness model, a vehicle crowdedness for one or more transit vehicles departing from one or more transit stations based at least in part on the real-time location data for the plurality of user computing devices; and communicating, by the computing system, data indicative of the vehicle crowdedness for at least one of the one or more transit vehicles to a particular user computing device, wherein the data indicative of the vehicle crowdedness includes information for displaying the vehicle crowdedness for the at least one of the one or more transit vehicles on the particular user computing device;

wherein the vehicle crowdedness model comprises a machine-learned model trained based at least in part on historical vehicle crowdedness data obtained from one of a plurality of transit systems and historical location data previously obtained from a plurality of user computing devices.

2. The computer-implemented method of claim 1, wherein determining, by the computing system using the vehicle crowdedness model, the vehicle crowdedness for the one or more transit vehicles departing from the one or more transit stations based at least in part on the real-time location data for the plurality of user computing devices comprises:

determining, by the computing system, a first subset of user computing devices departing from a first transit station based at least in part on the real-time location data for the plurality of user computing devices;

determining, by the computing system, a first portion of the first subset of user computing devices departing from the first transit station associated with a first transit vehicle using the vehicle crowdedness model; and determining, by the computing system, a vehicle crowdedness for the first transit vehicle based at least in part on the first portion.

3. The computer-implemented method of claim 2, wherein determining, by the computing system, the first subset of user computing devices departing from the first transit station based at least in part on the real-time location data for the plurality of user computing devices comprises determining, by the computing system, a number of user computing devices which have been at the first transit station for a time period less than a threshold.

4. The computer-implemented method of claim 1, further comprising:

obtaining, by the computing system, gate data for the one or more transit stations; wherein the gate data for each respective transit station comprises data indicative of a number of passengers entering or exiting the respective transit station; and wherein the vehicle crowdedness for the one or more transit vehicles departing from the one or more transit stations is further determined based at least in part on the gate data for the one or more transit stations.

5. The computer-implemented method of claim 1, wherein the real-time location data comprises one or more of geocode data, IP address data, WiFi access data, beacon access data, or cell phone tower data.

6. The computer-implemented method of claim 1, wherein the method further comprises:

receiving, by the computing system, a request from the particular user device for a vehicle crowdedness for one or more particular transit vehicles; and wherein communicating, by the computing system, data indicative of the vehicle crowdedness for at least one of the one or more transit vehicles to the particular user computing device comprises communicating, by the computing system, data indicative of the vehicle crowdedness for the one or more particular transit vehicles to the particular user computing device.

7. The computer-implemented method of claim 6, wherein the request from the particular user computing device for the vehicle crowdedness for the one or more particular transit vehicles comprises a request for a real-time vehicle crowdedness for one or more transit vehicles departing from a particular transit station.

8. The computer-implemented method of claim 6, wherein the request from the particular user computing device for a vehicle crowdedness for the one or more particular transit vehicles comprises a request for an expected vehicle crowdedness for one or more transit vehicles departing from a particular transit station at a future time.

9. The computer-implemented method of claim 6, wherein the request from the particular user computing device for the vehicle crowdedness for the one or more particular transit vehicles comprises real-time location data for the particular user computing device.

10. A computing system for determining vehicle crowdedness, comprising:

one or more processors; and one or more tangible, non-transitory, computer readable media that store instructions that when executed by the one or more processors cause the computing system to perform operations, the operations comprising:

obtaining real-time location data for a plurality of user computing devices, wherein the real-time location data comprises information identifying a real-time location corresponding to a transit station for each of the plurality of user computing devices;

receiving a request from a particular user computing device for a vehicle crowdedness for a first transit vehicle departing from a first transit station;

determining a first subset of user computing devices departing from the first transit station based at least in part on the real-time location data for the plurality of user computing devices;

determining a first portion of the first subset of user computing devices departing from the first transit station associated with the first transit vehicle using a vehicle crowdedness model;

determining the vehicle crowdedness for the first transit vehicle based at least in part on the first portion; and providing the vehicle crowdedness for the first transit vehicle for display on the particular user computing device;

wherein the vehicle crowdedness model comprises a machine-learned model trained based at least in part on historical vehicle crowdedness data obtained from one of a plurality of transit systems and historical location data previously obtained from a plurality of user computing devices.

11. The computing system of claim 10, wherein determining the first subset of user computing devices departing from the first transit station based at least in part on the real-time location data for the plurality of user computing devices comprises determining a number of user computing devices which have been at first transit station for a time period less than a threshold.

12. The computing system of claim 10, wherein the real-time location data comprises one or more of geocode data, IP address data, WiFi access data, beacon access data, or cell phone tower data.

13. The computing system of claim 10, wherein the operations further comprise:
obtaining gate data for the first transit station; wherein the gate data for the first transit station comprises data indicative of a number of passengers entering or exiting the first transit station; and
wherein the vehicle crowdedness for the first transit vehicle is further determined based at least in part on the first gate data.

14. The computing system of claim 10, wherein the first transit vehicle comprises a transit vehicle departing from the first transit station at a future time.

15. The computing system of claim 10, wherein the request from the particular user computing device for the vehicle crowdedness for the one or more particular transit vehicles comprises real-time location data for the particular user computing device.

16. At least one non-transitory computer-readable medium that stores instructions that, when executed by a computing device, cause the computing device to perform operations, the operations comprising:
obtaining real-time location data for a plurality of user computing devices, wherein the real-time location data comprises information identifying a real-time location corresponding to a transit station for each of the plurality of user computing devices;
determining a vehicle crowdedness using a vehicle crowdedness model for one or more transit vehicles departing from one or more transit stations based at least in part on the real-time location data for the plurality of user computing devices;
receiving a request from a particular user computing device for a vehicle crowdedness for one or more particular transit vehicles; and
communicating a response to the particular user computing device, wherein the response includes displaying the vehicle crowdedness for the one or more particular transit vehicles on the particular user computing device;
wherein the vehicle crowdedness model comprises a machine-learned model trained based at least in part on historical vehicle crowdedness data obtained from one of a plurality of transit systems and historical location data previously obtained from a plurality of user computing devices.

17. The at least one non-transitory computer-readable medium of claim 16, wherein determining the vehicle crowdedness using the vehicle crowdedness model for the one or more transit vehicles departing from the one or more transit stations based at least in part on the real-time location data for the plurality of user computing devices comprises:
determining a first subset of user computing devices departing from a first transit station based at least in part on the real-time location data for the plurality of user computing devices;
determining a first portion of the first subset of user computing devices departing from the first transit station associated with a first transit vehicle using the vehicle crowdedness model; and
determining the vehicle crowdedness for the first transit vehicle based at least in part on the first portion.

18. The at least one non-transitory computer-readable medium of claim 17, wherein determining the first subset of user computing devices departing from the first transit station based at least in part on the real-time location data for the plurality of user computing devices comprises determining a number of user computing devices which have been at the first transit station for a time period less than a threshold.

19. The at least one non-transitory computer-readable medium of claim 17, wherein the operations further comprise:
obtaining gate data for the one or more transit stations; wherein the gate data for each respective transit station comprises data indicative of a number of passengers entering or exiting the respective transit station; and
wherein the vehicle crowdedness for the one or more transit vehicles departing from the one or more transit stations is further determined based at least in part on the gate data for the one or more transit stations.

20. The at least one non-transitory computer-readable medium of claim 17, wherein the real-time location data comprises one or more of geocode data, IP address data, WiFi access data, beacon access data, or cell phone tower data.

* * * * *